United States Patent [19]

Buzzard et al.

[11] 3,801,740

[45] Apr. 2, 1974

[54] LIGHT PEN CIRCUIT AND REMOTE NOISE-IMMUNE PULSE DETECTOR FOR RASTER SCAN CRT DISPLAY SYSTEM

[75] Inventors: Clair Alan Buzzard, Eatontown; Louis Edward Drew, Matawan, both of N.J.

[73] Assignee: Bell Telephone Laboratories, Incorporated, Murray Hill, N.J.

[22] Filed: Dec. 15, 1971

[21] Appl. No.: 208,114

[52] U.S. Cl. ............ 178/6.8, 179/2 TV, 340/324 A

[51] Int. Cl. ............ H04n 7/18

[58] Field of Search ............ 178/6.8; 179/2 TV; 340/324 A

[56] References Cited

UNITED STATES PATENTS

| | | | |
|---|---|---|---|
| 3,579,225 | 5/1971 | Clark | 340/324 A |
| 3,594,608 | 7/1971 | Mutton | 340/324 A |
| 3,668,312 | 6/1972 | Yamamoto | 178/6.8 |
| 3,618,035 | 11/1971 | Simms | 178/6.8 |
| 3,584,142 | 6/1971 | Schoeffler | 178/6.8 |

*Primary Examiner*—Howard W. Britton
*Attorney, Agent, or Firm*—R. C. Lipton

[57] ABSTRACT

Video telephone stations, which include raster scan cathode-ray tubes, may be connected to each other or to a computing machine by way of a telephone switching system. Each station includes a light pen for providing sensings of the electron beam when video signals are received from the computing machine. The beam sensings are converted to pen pulses, combined with the synchronizing signals of the incoming video signals and the combined signals are transmitted to the computer. In order to distinguish between pen pulses and interference on the signaling link, the light pen aperture is arranged to be sufficient in size to enable the pen to sense an area covering elements of two successive scan lines on the screen, whereby two pen pulses are produced during a field. The computer recognizes a true light probe signal when successive ones of the received pen pulses are separated by an interval of time corresponding to the interval between beam traversals.

9 Claims, 9 Drawing Figures

LIGHT PEN CIRCUIT AND REMOTE NOISE-IMMUNE PULSE DETECTOR FOR RASTER SCAN CRT DISPLAY SYSTEM

FIELD OF THE INVENTION

This invention relates to visual communication systems and, more particularly, to light probe circuits for sensing light emitted from cathode-ray tube display screens and to the circuits for processing the light sensings.

DESCRIPTION OF THE PRIOR ART

A light probe or pen, when held adjacent to the screen of a cathode-ray tube display, senses light produced by the electron beam. This beam sensing can be communicated to and utilized by data processors and computers for retrieving stored information, for creating graphic representations, for providing specific processing functions, and for other uses.

In an information retrieval system, the computer preferably produces a "page" of video signals which enable a raster scan display terminal to display a page of "index" characters on the screen, each character designating information stored by the computer. The operator then positions the aperture of the light pen over a selected one of the displayed characters. A resultant light probe signal is produced at the instant that the electron beam traverses the area occupied by the displayed character. This information is translated to identify the corresponding coordinate area of the screen. The computer then retrieves the designated information in accordance with the screen area identification.

The data display terminal may be located remote from the computer, and in some cases the terminal communicates with the computer over telephone lines. In any event, the longer the link between the computer and the user, the greater the likelihood that noise will interfere with the communication. Since the light probe signal is customarily a single, short pulse, it may be difficult to distinguish between pen pulses and interference.

Accordingly, it is an object of this invention to enable visual communication systems to identify light probe signals communicated over signaling links subject to noise and other interference.

SUMMARY OF THE INVENTION

In accordance with this invention, a true light probe signal is determined in the presence of interference by sensing an area on the screen sufficient in size to cover elements of two successive scan lines, communicating the resultant beam sensing over the signaling link and producing the light probe signal when successive ones of the received beam sensings are separated by an interval of time corresponding to the interval between successive beam traversals. The size of the light pen aperture is advantageously arranged to enable the pen to sense the area covering two successive scan lines. The beam is therefore sensed twice during a field and once for each of two successive horizontal traversals of the beam across the screen.

In the illustrative embodiment of this invention, the light pen cooperates with a light sensing device for producing light pen pulses. The pen pulses are combined with the synchronizing signals stripped from the video signals received from the remote computer and the combined signals are then transmitted to the computer. At the remote computer station, the synchronizing signals and the pen pulses are separated, the true light probe signal is determined from the pen pulses and is processed with the synchronizing signals to identify the screen area sensed by the light pen.

The foregoing and other objects and features of this invention will be more fully understood from the following description of an illustrative embodiment thereof taken in conjunction with the accompanying drawings.

DETAILED DESCRIPTION

Figure 1:
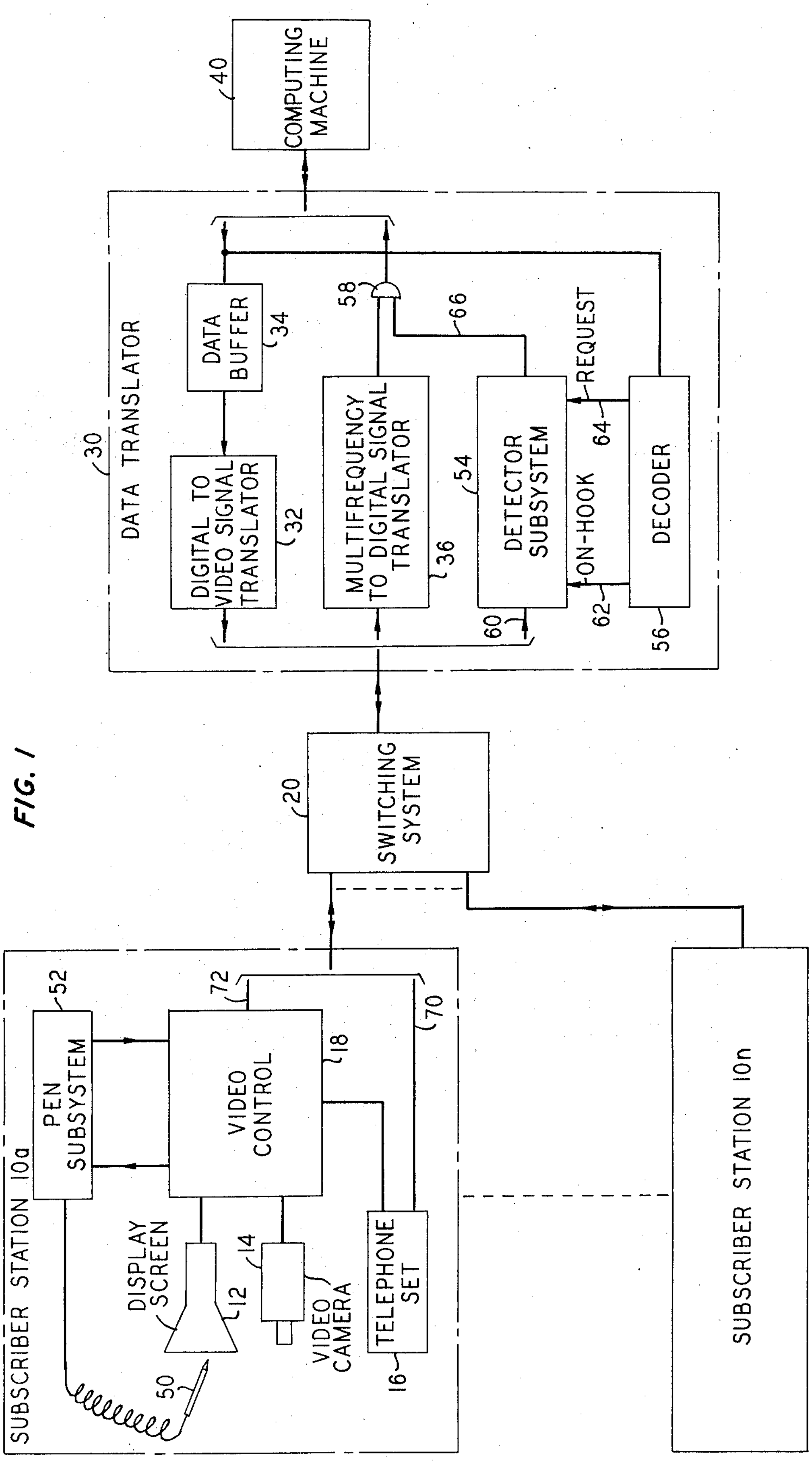
FIG. 1 depicts, in block form, a visual communication system which includes a computer station and a plurality of raster scan display terminals, each display terminal having the capability of transmitting light beam sensings to the computer station in accordance with this invention.

The visual communication system, as seen in FIG. 1, includes a plurality of subscriber stations 10$_a$ to 10$_n$, each connected to switching system 20, which, in turn, is connected via data translator 30 to computing machine 40. Translater 30 and computing machine 40 comprise a computer station connected to switching system 20. Each subscriber station includes a video telephone set wherein there is provided video camera 14, a cathode-ray tube display screen 12, video control circuitry 18 and a standard telephone set 16 capable of generating multifrequency signals. To the extent described so far, this system is shown and described in U.S. Pat. No. 3,587,053, which issued to J. J. Horzepa, J. J. Mansell and R. L. Simms, Jr. on June 22, 1971.

As disclosed in the patent of J. J. Horzepa et al, each subscriber may initiate a connection with any other subscriber served by switching system 20 by dialing or keying an appropriate code on telephone set 16, causing the generation of switching signals which are transmitted via lead 70 to switching system 20 and there processed. Switching system 20, upon processing the switching signals, establishes a video connection between the initiating subscriber station, such as station 10$_a$, and the station specified by the switching signals, such as station 10$_n$. After the connection is established, the two subscribers may communicate with each other visually as well as orally, as described in the *Bell Laboratories Record*, Vol. 42, No. 4, April 1964, pages 114–120, and also described in the *Bell System Technical Journal*, Vol. 50, No. 2, February 1971, pages 221 to 313.

Each subscriber may also establish a connection between his station and computing machine 40 for either information retrieval or computer services. Such a connection is established by keying a code on telephone set 16 identifying computing machine 40. The switching signals generated thereby are processed by switching system 20, which establishes a connection between the initiating station and data translator 30. Translator 36 in data translator 30 detects the origination of the call by detecting ringing current applied by switching system 20 and signals computer machine 40 that a connection is established. Computing machine 40 thereupon generates a set of instructions to guide the subscriber in the use of the computer service. These instructions, in the form of digital output signals, are applied to data buffer 34 and then to video signal translator 32 where the digital signals are converted to video signals. The video signals are then transmitted via switching system 20 to the initiating subscriber and then, by way of cable 72 and video control 18, to display screen 12, where the instructions are displayed. Such instructions might indicate what types of information may be retrieved and how to retrieve it, what types of arithmetic calculations may be performed and instructions for performing them, et cetera. Advantageously, the instructions are presented as a page of characters, the screen accommodating twenty rows of characters arranged in 22 columns.

Instructions to the computing machine 40 are keyed on telephone set 16, causing the generation of multifrequency signals (in the same manner as the generation of the switching signals) and these signals are transmitted back through switching system 20 to data translator 30. Translator 36 translates the multifrequency signals to digital input signals and applies them through gate 58 to computing machine 40. The computing machine processes these signals and generates digital output responses which are applied to data buffer 34 and then to translator 32 for translation to video signals. The video signals, as before, are transmitted to the initiating station for display. The above-described system constitutes the system disclosed in the J. J. Horzepa et al patent.

In addition to the above-described capabilities, the subscriber is provided with the further capability of identifying any coordinate position on screen 12 and sending the identification of the coordinate position to computing machine 40. The subscriber identifies the coordinate by positioning the aperture of light pen 50 on the corresponding area on display screen 12. Light pen 50 senses the beam traversing any scanning line in the area of the screen under the pen aperture. The beam sensings of light pen 50 are converted to pen pulses and combined with the incoming video synchronization signals, the conversion of the beam sensings to pen pulses and the combining of the signals being performed by pen subsystem 52. The combined signals are then passed by video control 18 through cable 72 through switching system 20 to data translator 30 and then via cable 60 to detector subsystem 54. Detector subsystem 54 recovers the light pen information and converts this information to digital signals defining the coordinate position of light pen 50. This digital information is passed by way of lead 66 and gate 58 to machine 40.

Figure 5A:
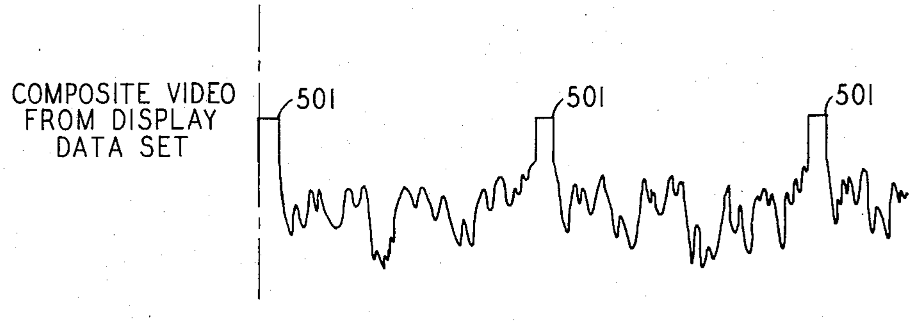
FIGS. 5A–5D depict various timing waves which represent signals and pulses produced by the visual communication system.

The waveform of the incoming video signals, displayed on the screen, is shown in FIG. 5A. The depicted wave includes synchronizing signals 501 and intermediate video signals, the depicted wave constituting a portion of a field and synchronizing signals 501 comprising horizontal synchronization signals. The video signals intermediate any two of horizontal synchronization signals 501 comprise the video signals in one scanning line.

In accordance with this invention, the aperture of light pen 50 is dimensioned to sense an area covering elements of at least two lines in a field (each frame constituting two interlaced fields whereby the area will also cover elements of one or more lines in the other field). Light pen 50 therefore senses the beam on the face of display screen 12 in each of two successive lines in the same field.

Figure 5B:
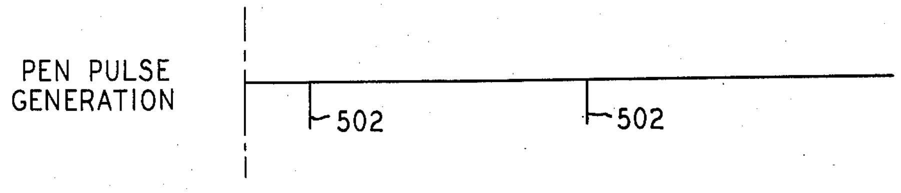

The pen pulse signals generated by pen subsystem 52 from the light beam sensings of light pen 50 are shown in FIG. 5B and are identified as pulses 502. It is to be noted that the pen pulses 502 appear as negative pulses, one pulse appearing during the scan of each of two successive lines and in substantially identical positions in each of the line scans. In the present embodiment the duration of each line traversal is 125 microseconds; each synchronization pulse 501 separation is therefore 125 microseconds and the pen pulse separation is therefore also 125 microseconds.

Figure 2:
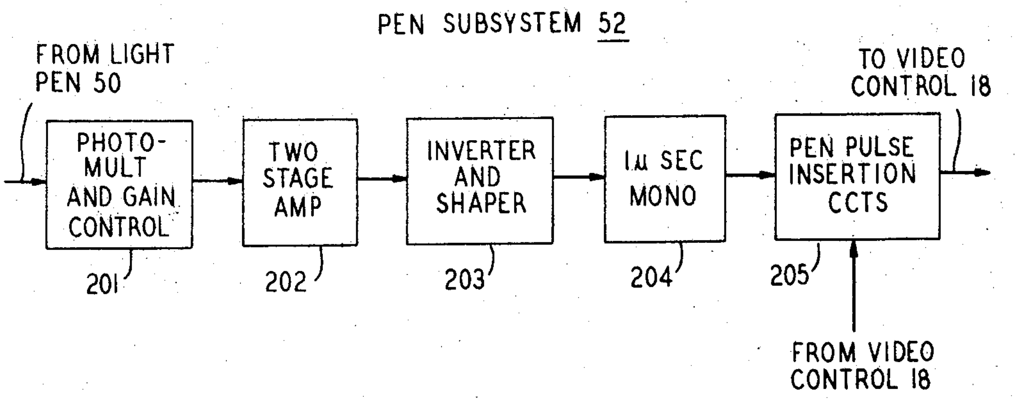
FIG. 2 shows, in schematic block form, the pen subsystem circuitry in each display terminal for converting light sensings into pen pulses and for combining the pen pulses with synchronizing signals.
Figure 5C:
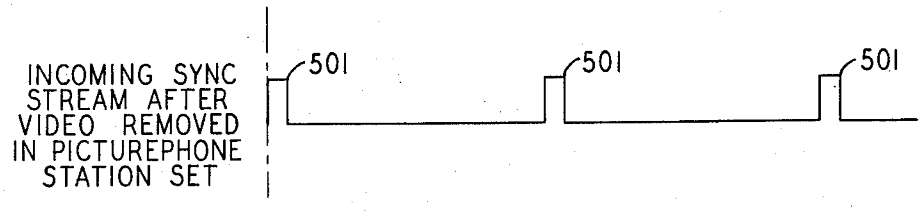
Figure 5D:
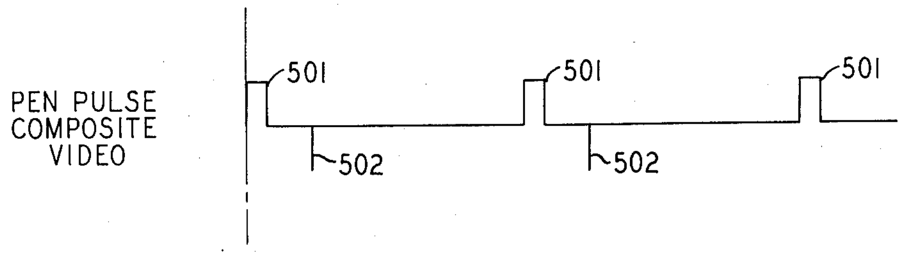

The incoming video signal is received by video control 18 (for application of the video to display screen 12, as previously noted). The functions of video control 18 are described in detail in the aforementioned *Bell System Technical Journal* and, more specifically, in an article "Station Set Components", by A. M. Gordon and J. B. Singleton, pages 313 to 349, the transmitter portion of video control 18 being depicted in the article on page 315 in FIG. 2 and the receiver portion being depicted on page 316 in FIG. 3. One function of the receiver portion is to strip off the video signal and retain the synchronization signals for beam sweep control. These synchronization signals, depicted in FIG. 5C, are, in this present embodiment, also applied by video control 18 to pen subsystem 52. As described in detail hereinafter, pen subsystem 52 combines the synchronization signals and pen pulses to form the wave shown in FIG. 5D. The combined wave is then applied to the transmitter portion of video control 18, and, more specifically, to the output "gate" (which gate is depicted in FIG. 2 of the *Bell System Technical Journal* article) for transmission through switching system 20 to detector subsystem 54 in data translator 30.

Detector subsystem 54 separates the video signals containing the pen pulses from the synchronization signals, utilizing the synchronization signals to maintain a running identification of the instantaneous position of the electron beam on the face of display screen 12. At the same time, detector subsystem 54 examines the video to recover the pen pulses, the requirement being that two successive pulses must be 125 microseconds apart. If this criteria is satisfied, the pulses are identified as pen pulses. If the computer has requested coordinate information, as discussed hereinafter, detector subsystem 54 utilizes the pen pulse identification, together with the running identification, to locate the coordinate position of light pen 50. This position is translated to data and sent on to computer machine 40.

Many different sequences of operation may be provided in accordance with the capabilities of computing machine 40. One simple sequence within the capability of a computer machine and which can readily be provided by the present system constitutes the following steps. The subscriber transmits the previously described switching signals to connect him with data translator 30 and computer machine 40. In addition, the subscriber keys additional signals indicating his desire for "light pen interaction". These keyed signals are translated by signal translator 36 and are passed to computing machine 40. Computing machine 40 thereupon returns through data buffer 34 to translator 32 a page of information defining the various options available. This page of information is translated to video signals by translator 32 and sent to the subscriber. At the same time, computing machine 40 sends a "request" data code to decoder 56. Decoder 56, in response thereto, pulses lead 64 to advise detector subsystem 54 that computer 40 is requesting pen information. At the same time, the subscriber, noting the page of information on the face of the display screen, locates the aperture of light pen 50 on the character defining the option that he desires. Advantageously, a push-button or mechanical button is also operated by the subscriber to enable the pen to sense the beam on the face of display screen 12 and transmit the sensings to pen subsystem 52. One manner in which this mechanical button may operate is to remove a shutter across the face of the aperture, thus permitting light to pass through the aperture. The pen pulses are thereupon combined with the synchronization signals by pen subsystem 52 and the signals are returned through switching system 20 to detector subsystem 54. Detector subsystem 54 thereupon processes the incoming synchronization signals and the pen pulse signals to locate the position of light pen 50 on the face of display screen 12. The location of the light pen is ascertained and the code signals defining this location are passed through gate 58 to computing machine 40, detector subsystem 54 at the same time terminating its "request" condition. Computing machine 40 now has sufficient information to recognize the option desired by the subscriber and, in accordance with the computer program, steps to the next operation. This operation may be to provide a next successive option to the subscriber or to provide instructions for any other sequential steps. If a new light pen sensing is included in this next step, a new "request" is also sent to decoder 56 and the above-described sequence of operation is repeated. This interaction between the subscriber and computing machine 40 then continues until the subscriber terminates by either sending an appropriate keyed data signal or by going "on-hook". The termination of the sequence is recognized by computing machine 40, which sends "on-hook" data to decoder 56 and decoder 56, in turn, pulses ON-HOOK lead 62. In accordance with the specific arrangement disclosed herein, detector subsystem 54 sends a terminating code sequence to computer machine 40 by way of gate 58 and, after the transmission of the sequence, detector subsystem 54 restores itself to its initial condition.

The light sensing elements of light pen 50 advantageously comprise a bundle of light sensitive fibers arranged and displaced in the aperture of the light pen in such a manner as to sense a defined area on the face of display screen 12 covering the elements of two lines in the same field. Assuming that the subscriber has operated the mechanical contact removing the shutter across the aperture, and further assuming that a traversal of the beam along one of the lines is sensed, a light pulse is passed through the fibers to pen subsystem 52. The details of pen subsystem 52 are shown in FIG. 2 and it can be seen therein that the light pulse from pen 50 is applied to photo multiplier 201 in FIG. 2.

The function of photo multiplier 201 is to convert a light pulse to an electron pulse. This electron pulse is then passed to amplifier 202. The amplified pulse is inverted by inverter 203, producing a negative pulse corresponding to each light pulse from light pen 50. This negative pulse enables monopulser 204 to reproduce a negative spike or pulse which was previously identified as pen pulse 502 (FIG. 5B). The pen pulse is then applied to pen pulse insertion circuits 205. The other input of pen pulse insertion circuits 205 is derived from video control 18 and, as previously described, constitutes the incoming synchronization pulse stream depicted in FIG. 5C. Pen pulse insertion circuits 205 comprise conventional mixing circuits for combining the pen pulses with the synchronization pulses. The output of pen pulse insertion circuits 205, therefore, comprises the composite video signal depicted in FIG. 5D. As previously noted, this composite video signal is then passed to the transmitter portion of video control 18 for transmission through switching system 20 to detector subsystem in data translator 30.

Figure 3A:
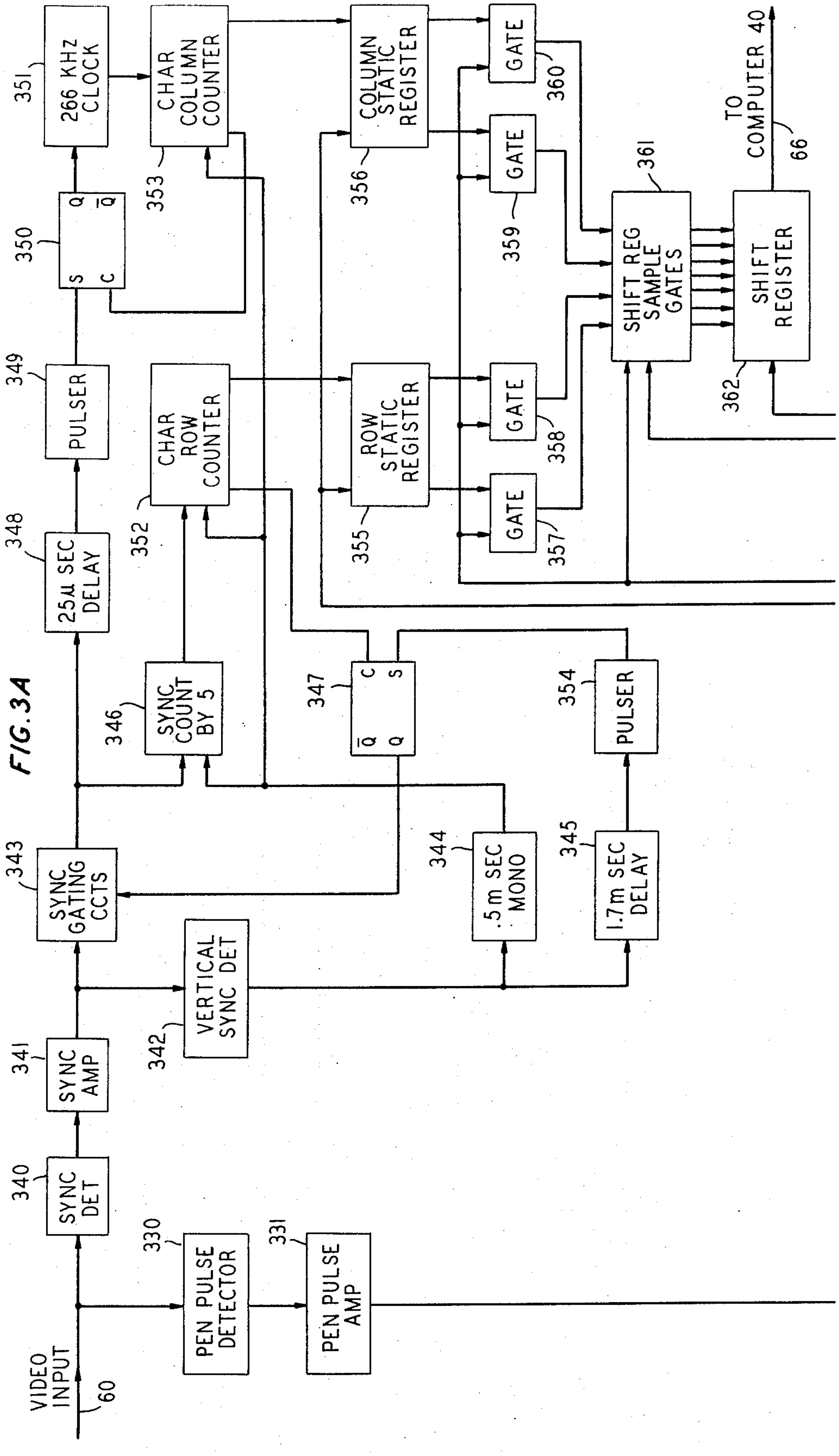
FIGS. 3A and 3B, when vertically aligned, show, in schematic form, the detector subsystem circuitry at the computer station for receiving the combined pen pulses and synchronizing signals and, in response thereto, for identifying the screen area sensed by the light pen.
Figure 3B:
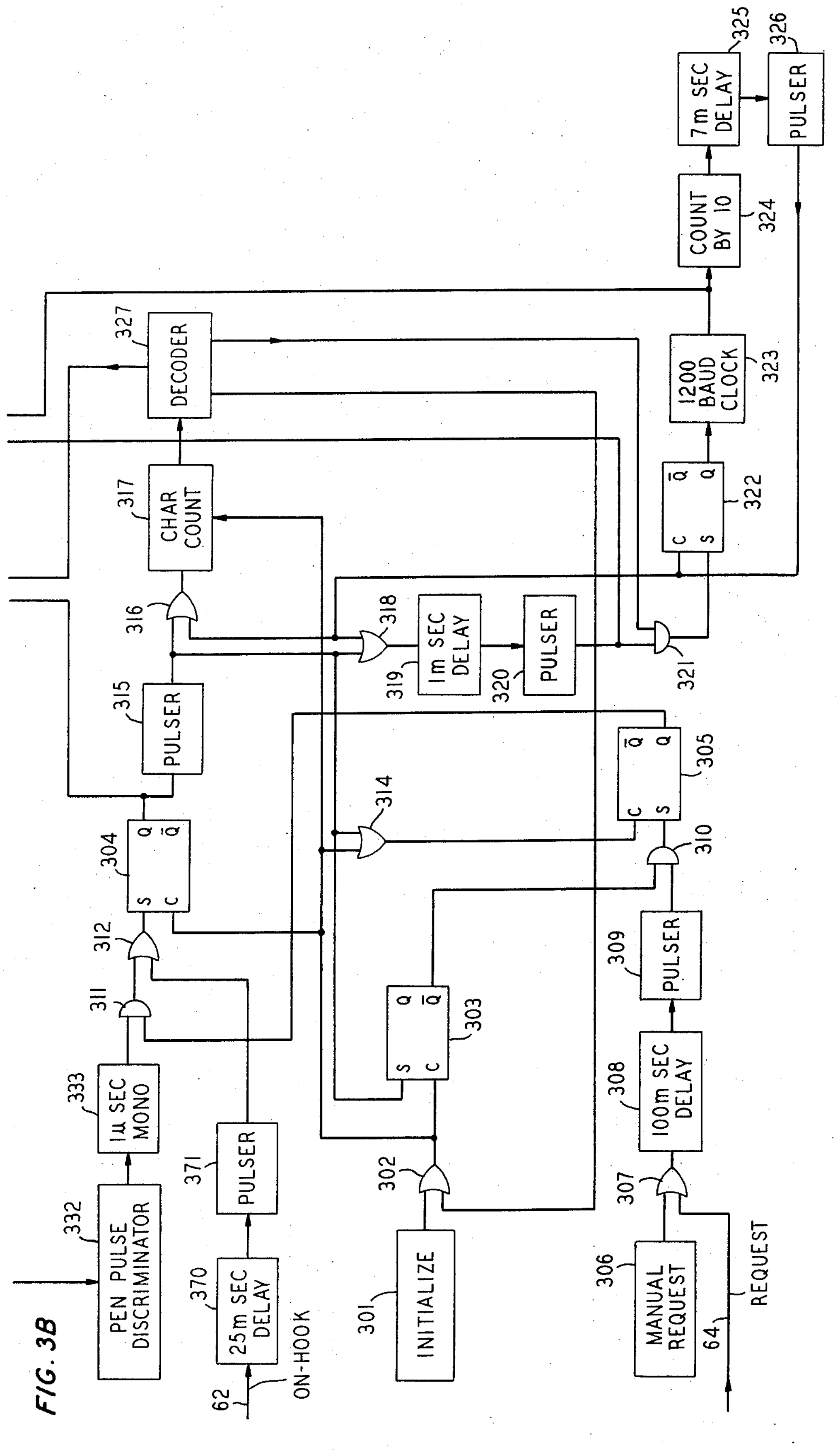

Detector subsystem 54 shown in detail in FIGS. 3A and 3B may be placed in its initial condition by either manual operation or by the turning on of the power. The power turn-on may result in the operation of electromechanically controlled contacts. The manual operation may consist of, for example, the operation of push-button controlled contacts. In either event, the contacts are represented by block 301 in FIG. 3B. The operation of the contacts then provides a pulse to OR gate 302 and OR gate 302 passes the pulse therethrough to clear flip-flops 303 and 304 (if the flip-flops are SET). The clearing of flip-flop 303 enables AND gate 310. In addition, the pulse is passed through OR gate 314 to clear flip-flop 305. Finally, the pulse derived from the output of OR gate 302 is passed to counter 317, restoring the count, if any, to zero.

When a remote station calls computer 40, he is cut through by switching system 20 to data translator 30, as previously described. The video output of the remote subscriber is therefore passed to detector subsystem 54. The video signal input is received on lead 60 in FIG. 3A and passed to sync detector 340 and pen pulse detector 330.

Sync detector 340 removes the video signal and retains the horizontal and vertical synchronization pulses. These synchronization pulses are amplified by sync amplifier 341 and the amplified pulses are passed to sync gating circuits 343 and vertical sync detector 342. Vertical sync detector 342 detects each vertical synchronization pulse that occurs at the beginning of each field. Sync detector 340 is advantageously arranged to strip the video and retain the synchronization pulses and sync detector 342 is arranged to detect the vertical synchronization pulses, in a manner similar to the manner that the receiver portion of video control 18 performs these functions.

The vertical synchronization pulses detected by vertical sync detector 342 are passed to monopulser 344 and delay circuit 345. Monopulser 344 provides a pulse of approximately 0.5 millisecond. During this pulse, counters 346, 352 and 353 are cleared. Delay circuit 345 delays each vertical synchronization pulse for 1.7 milliseconds. This delay corresponds to the interval required for the electron beam of display screen 12 to traverse the several lines at the top of the field until it reaches the line at the top of the first character row (it being recalled that the screen accommodates 20 rows of characters in 22 columns). After this 1.7 millisecond interval delay, delay circuit 345 operates pulser 354. This provides a pulse to flip-flop 347, flip-flop 347 is SET and the flip-flop, in turn, enables sync gating circuits 343.

At this time, horizontal synchronization pulses in a field are being received. With sync gating circuits 343 enabled, amplified horizontal synchronization pulses are provided by sync amplifier 341 and are passed to sync counter 346 and, at the same time, are passed to delay circuit 348. Sync counter 346 provides a count of the horizontal synchronization pulses, determining when a count of five is achieved. Each character on screen 12 occupies a height of five scan lines for each of the interlaced fields, or 10 lines per frame. Counter 346 counts five horizontal synchronization pulses and provides an output which is passed to counter 352. The output of counter 346, therefore, indicates each instant that the beam begins the scanning of the first line in a new row of characters.

Counter 352 identifies the character row corresponding to the instantaneous position of the beam. The counter is advanced by counter 346 and, therefore, is advanced when the beam starts to scan the line constituting the beginning of each character row. The row identification of the instantaneous position of the beam is continuously applied to register 355.

After counter 352 counts 20 rows, the number of rows of characters displayed on screen 12, a pulse is applied to the CLEAR input of flip-flop 347. This knocks down the flip-flop, disabling, in turn, sync gating circuits 343. The subsystem now awaits the next vertical synchronization pulse to re-initialize the counters and recount the rows.

It is recalled that the horizontal synchronization pulses are also provided by sync gating circuits 343 to delay circuit 348. Delay circuit 348 provides a 25 microsecond delay, which delay corresponds to the interval required by the beam of the tube to traverse a scan line from the beginning of the line to the left edge of the character in the first character column. Upon the termination of the delay, delay circuit 348 enables pulser 349 to SET flip-flop 350. The setting of flip-flop 350 enables clock 351. Clock 351 is a 266 kHz clock whose frequency is such that it provides an output pulse each time the electron beam advances to the left edge of each of the character positions. These pulses are passed to character column counter 353, advancing the counter in response to each pulse. The advance of counter 353, therefore, provides an instantaneous identification of the character column being scanned by the beam. This instantaneous identification is continuously applied to register 356.

It is recalled that there are 22 character columns on screen 12 of the tube. When the beam scan passes the last column, counter 353 achieves the count of 22, the counter resets and a clearing pulse is passed to flip-flop 350. This clears the flip-flop and the flip-flop, in turn, knocks down clock 351. The counting operation by counter 353 is, therefore, terminated. When the next line is scanned, the next horizontal synchronization pulse is received and, after a 25 microsecond delay, pulser 349 again SETS flip-flop 350. Clock 351 is again enabled, and the character column count for the next line is provided in the same manner as described for the previous line. Accordingly, this operation is repeated during the scanning of each of the scan lines.

As previously described, when the remote subscriber indicates that he is sending pen information, computer 40 provides a "request" signal to decoder 56 and the decoder, in turn, pulses REQUEST lead 64. The pulse on lead 64 is passed to OR gate 307 (FIG. 3B). Alternatively, a manual request may be initiated, which manual request may constitute the operation of a push-button, represented by block 306. In any event, a pulse is passed through OR gate 307 to delay circuit 308. Delay circuit 308 provides a delay which may advantageously comprise 100 milliseconds. This delay is utilized to permit the computer, after making its request, time to arrange itself to accept the coordinate information from detector subsystem 54. Accordingly, after the 100 millisecond delay, delay circuit 308 enables pulser 309 to pass a delay pulse to AND gate 310.

AND gate 310 was previously enabled during the initializing operation. With AND gate 310 enabled, the delayed pulse from pulser 309 is passed through to SET flip-flop 305. The setting of flip-flop 305 now enables AND gate 311.

As previously noted, the video signal is received by detector subsystem 54 on video input lead 60 and this signal is passed to pen pulse detector 330. Pen pulse detector 330 (FIG. 3A) detects the pen pulses by virtue of the fact that these pulses are negative and are, therefore, opposite in polarity with respect to the synchronization pulses. The detected pen pulses are then applied to amplifier 331, which inverts the pulses, and the amplified pen pulses, which are now positive pulses, are passed to pen pulse discriminator 332.

As described in detail hereinafter, pen pulse discriminator 332 recognizes the pen pulses in the presence of noise. More specifically, pen pulse discriminator 332 will examine each pen pulse and, in the event that a pen pulse is received 125 microseconds after the reception of a previous pulse, the pulse will be considered a true pen pulse. Pen pulse discriminator 332 thereupon operates monopulser 333 and the monopulser, in turn, passes a pulse through AND gate 311, which AND gate was previously enabled by flip-flop 305.

The output of AND gate 311 is passed through OR gate 312 to SET flip-flop 304. Flip-flop 304 SET enables the storage of the instantaneous character row information provided by counter 352 into register 355 and enables the storage of the instantaneous character column information provided by counter 353 into register 356. Register 355 applies the character row identification to gates 357 and 358. More specifically, register 355 applies the identification of the most significant digit of the row number to gate 357 and the identification of the least significant digit to gate 358. Similarly, register 356 presents the most significant digit of the character column number to gate 359 and the least significant digit to gate 360.

The setting of flip-flop 304 also enables pulser 315. Pulser 315 thereupon applies a pulse to OR gates 316 and 318. In addition, pulser 315 SETS flip-flop 303 and CLEARS flip-flop 305 by way of OR gate 314. The setting of flip-flop 303 disables AND gate 310. Detector subsystem 54 is, therefore, blinded to subsequent "requests". The clearing of flip-flop 305 disables AND gate 311. This now blocks any additional pen pulse signals provided by the combination of pen pulse discriminator 332 and monopulser 333.

The pulse applied by pulser 315 to OR gate 316 is passed through to counter 317. Counter 317 advances to the count of one. This count is decoded by decoder 327. At the count of one, decoder 327 opens gate 358. This passes the least significant digit of the row number through the gate to sample gates 361. The function of sample gates 361 is to provide a translation of the digit applied thereto to a corresponding code character (which code character is advantageously the ASCII code format).

Pulser 315 also applies a pulse to OR gate 318, as previously noted. This pulse is passed to delay circuit 319. After approximately a millisecond delay, delay circuit 319 enables pulser 320 and a delayed pulse is passed to AND gate 321 and to sample gates 361. Sample gates 361 are now enabled to apply the several bits of the code character to the several states of shift register 362, which bits represent the least significant digit of the row number.

It is recalled that pulser 320 also applies a pulse to AND gate 321. The other input to AND gate 321 is provided by decoder 327. Decoder 327 normally enables AND gate 321 and the output of pulser 320 is therefore passed through to SET flip-flop 322. The setting of flip-flop 322 enables clock 323 and clock 323 provides shift pulses for shift register 362 at a rate appropriate for inputting to computer 40. Accordingly, the data character identifying the least significant digit of the row number is shifted out of shift register 362 and passed to computer 40.

The data character constitutes ten bits. These bits are counted by counter 324, since it counts the number of shift pulses provided by clock 323. When ten shift pulses have been produced, counter 324 passes a pulse to delay circuitry 325. After a delay of approximately 0.7 millisecond (which advantageously comprises an interval of a "stop" signal), delay circuit 325 enables pulser 326. Pulser 326, in turn, CLEARS flip-flop 322, thereby stopping clock 323 to terminate the shifting of shift register 362. In addition, the output pulse of pulser 326 is passed through OR gate 316 to character counter 317 and through OR gate 318 to delay circuit 319. Character counter 317 advances to the count of two and decoder 327, in response to this count, shuts down gate 358 and opens gate 357. The most significant digit of the character row is thereupon applied to sample gates 361.

The pulse applied to delay circuit 319 operates the delay circuit to enable pulser 320 after a delay. Pulser 320, in turn, enables sample gates 361 to translate the most significant digit of the row number to the corresponding code character and apply the bits of the code character to the stages of shift register 362. At the same time, the output of pulser 320 is passed through AND gate 321 to again SET flip-flop 322. Consequently, as previously described, clock 323 is enabled, the code character in shift register 362 is shifted to computer 40, counter 324 counts the shift pulses, and at the termination of the transmission of the code character (that is, when counter 324 counts to ten), a pulse is passed to delay circuit 325. Delay circuit 325 operates pulser 326. Pulser 326, in turn, again CLEARS flip-flop 322, advances counter 317 by way of OR gate 316, and pulses delay circuit 319 by way of OR gate 318. Counter 317 advances to the count of three and decoder 327, in response to this count, shuts down gate 357 and opens gate 360. Gate 360 thereupon passes the least significant digit of the character column number to sample gates 361. Delay circuit 319 enables pulser 320 and pulser 320, in turn, provides a pulse to sample gates 361. Gate 361 thereupon translates the least significant digit of the column number to a corresponding data character and applies the bits of the character, in parallel, to shift register 362. At the same time, the delayed pulse of pulser 320 is passed through AND gate 321 to again SET flip-flop 322. Accordingly, clock 323 is enabled, shift register 362 shifts out the code character to computer 40 and, at the termination thereof, counter 324 applies a pulse to delay circuit 325. Delay circuit 325 operates pulser 326 and pulser 326, in turn, CLEARS flip-flop 322, advancing counter 317 and pulsing delay circuit 319 in the same manner as previously described. Counter 317 now advances to the count of four. At this count, decoder 327 shuts down gate 360 and opens gate 359. Gate 359 passes the most significant digit of the character column number to sample gates 361. The pulse applied to delay circuit 319 is passed to pulser 320 and pulser 320, in turn, enables sample gates 361 to apply the code character corresponding to the most significant digit to shift register 362. Pulser 320 also SETS flip-flop 322 by way of AND gate 321. Clock 323 is again enabled, the code character is shifted out by shift register 362 and at the termination of the shifting out of the code character, counter 324 pulses delay circuit 325. Pulser 326 is enabled and CLEARS flip-flop 322. In addition, pulser 326 advances counter 317 by way of OR gate 316. At the count of five, decoder 327 now shuts down gate 359. Decoder 327 also impresses an "end-of-text" (ETX) character on sample gates 361.

The output pulse from pulser 326 is also passed through OR gate 318 to delay circuit 319. Pulser 320 thereafter applies an enabling pulse to sample gates 361. The gates pass the ETX code character to shift register 362. The output of pulser 320 is also passed through AND gate 321 to SET flip-flop 322. Clock 323 is therefore enabled and the ETX character is passed to computer 40. At the end of transmission of the ETX character, counter 324 pulses delay circuit 325. Pulser 326 is enabled to CLEAR flip-flop 322. At the same time, pulser 326 passes a pulse by way of OR gate 316 to advance counter 317 to the count of six. The decoder thereupon removes the application of the ETX character to sample gates 361. At the same time, decoder 327 disables AND gate 321. This terminates the transmission of characters to the computer.

When counter 317 advances to the count of six, decoder 327 also applies a pulse to OR gate 302. This reinitializes the circuit by CLEARING flip-flops 303 and 304, CLEARING flip-flop 305 by way of OR gate 314 and resetting counter 317 to the initial or zero count. The detector subsystem is now in its initial condition and is again prepared to accept a new request from the computer and process subsequent output pulses from pen pulse discriminator 332.

It is to be noted that in the code sequence the computer received five characters; namely, the least significant digit and the most significant digit of the character row number, the least significant and the most significant digit of the character column number and the ETX character.

As previously described, when the subscriber terminates the call computing machine 40 sends "on-hook" data to decoder 56 (FIG. 2) and decoder 56, in turn, pulses ON-HOOK lead 62. The pulse on lead 62 enables delay circuit 370 to operate pulser 371. Pulser 371 applies a pulse by way of OR gate 312 to SET flip-flop 304. With flip-flop 304 SET, a terminating code sequence is transmitted to computer machine 40. This code sequence comprises four random characters and terminates with the ETX character.

The setting of flip-flop 304 enables registers 355 and 356, each of the registers obtaining a random number from counters 352 and 353, respectively. These numbers, which, of course, define the instantaneous position of the electron beam on display screen 12, are considered random numbers since computer 40 is concerned only with receiving four characters prior to the ETX character.

The setting of flip-flop 304 also enables pulser 315 and pulser 315, in turn, advances counter 317 to the count of one and, in addition, sets flip-flop 303 and enables delay circuit 319 by way of OR gate 318. The advance of counter 317 and the enabling of delay circuit 319 operate to pass a random number through gate 358 to sample gates 361, to translate the random number to a corresponding code character, to apply the code character to shift register 362, and to shift out the character to computer 40, in the same manner as previously described for the generation of the character designating the least significant digit of the row number. Thereafter, three more number characters are produced, applied to shift register 362, and sent on to computer 40 in the same manner as the production of the most significant digit of the row number and the least significant and most significant digits of the column number. At this time counter 317 advances to the count of five. At this count decoder 327 applies the ETX code character to sample gates 361 and the ETX code character is thereby sent to computer 40. Thereafter, counter 317 advances to the count of six, whereupon decoder 327 removes the application of the ETX character to sample gates 361 and applies a pulse through OR gate 302 to CLEAR flip-flops 303 and 304 and to RESET counter 317 to the initial or zero count. This again restores detector subsystem 54 to its initial condition.

Figure 4:
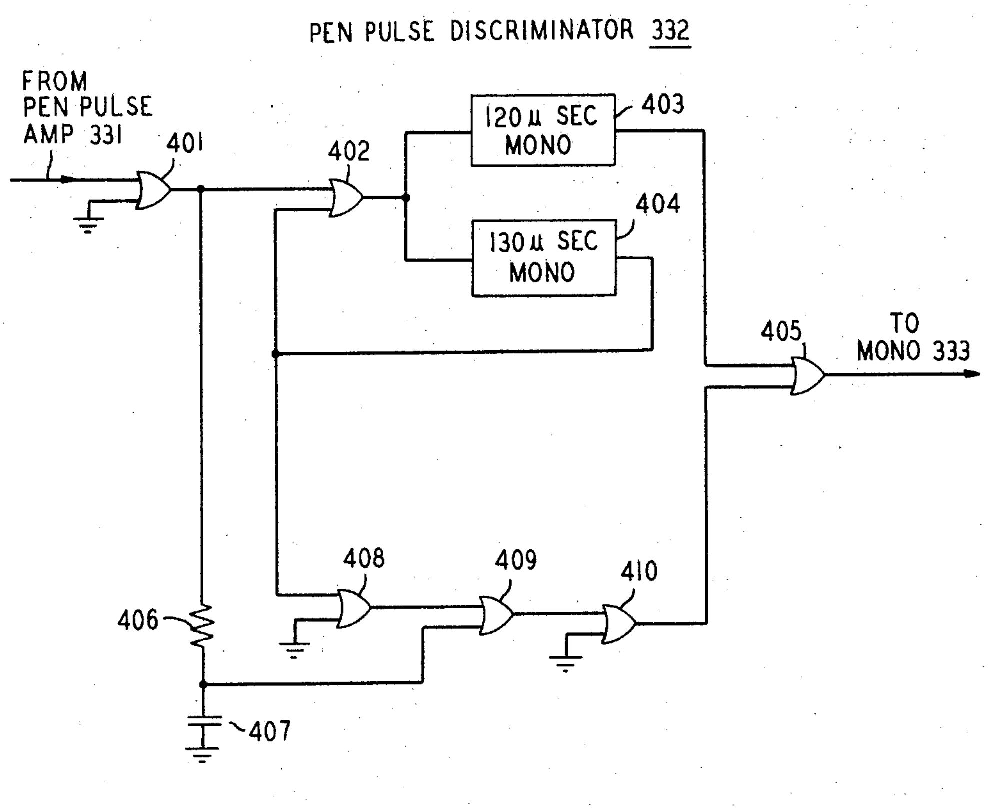
FIG. 4 shows, in schematic form, the detailed circuitry of the pen pulse discriminator in the detector subsystem that determines the true light probe signals from the received pulses.

The specific details of pen pulse discriminator 332 are shown in FIG. 4. The input to pen pulse discriminator 332 is derived from the output of pen pulse amplifier 331, which output is applied to NOR gate 401. The output of pen pulse amplifier 331 is normally in a low condition. The output of NOR gate 401 is, therefore, normally in a high condition. This high condition is passed by way of resistor 406 to the upper plate of capacitor 407, as seen in FIG. 4. The combination of resistor 406 and capacitor 407, as described hereinafter, will provide a delay of the pen pulses from the output of NOR gate 401 before application to an input of NOR gate 409.

In the present initial condition, the output of monopulser 404 is low. This low condition enables NOR gate 402 and drives the output of gate 408 to a high condition. NOR gate 409 is therefore disabled, its output is maintained low whether or not a delayed pen pulse is applied thereto. The output of NOR gate 410 is therefore high, and the output of NOR gate 405 is therefore initially in a low condition.

Assume now that a pen pulse is received. Pen pulse amplifier 331 applies a pen pulse to NOR gate 401. The output of NOR gate 401 momentarily goes low and this negative-going pulse is passed to NOR gate 402. Since NOR gate 402 is initially enabled by monopulser 404, the application of the pen pulse to NOR gate 402 provides a positive-going pulse at its output. This pulse operates both monopulser 403 and monopulser 404.

Monopulser 403, in response to the pen pulse, provides at its output a high condition for 120 microseconds. Concurrently, monopulser 404 provides at its output a high condition for 130 microseconds. The high output of monopulser 403 is applied to the input of NOR gate 405 to disable the gate. The output of NOR gate 405 will, therefore, be maintained low for at least the next 120 microseconds.

The output of monopulser 404 extends to the input of NOR gate 408 in addition to extending to the input of NOR gate 402. During the next 130 microseconds, NOR gate 402 is disabled, its output being held low due to the high condition applied thereto by monopulser 404. In addition, the output of NOR gate 408 is held low and gate 409 is enabled for the next 130 microseconds. The received pen pulse is passed to gate 409, after a delay provided by resistor 406 and capacitor 407. Gate 409, now being enabled, passes the pen pulse through NOR gate 410 to NOR gate 405. NOR gate 405 is not affected by this pen pulse, however, since it has been previously disabled by monopulser 403.

During the next 120 microseconds, pen pulse discriminator 332 will block or inhibit the detection of any incoming (noise) pulses. This is due to the fact that NOR gate 402 is disabled by monopulser 404 and NOR gate 405 is disabled by monopulser 403. After the 120 microsecond interval, however, monopulser 403 removes its disabling potential from NOR gate 405.

We have presumed that a true pen pulse will be received 125 microseconds after the previous pen pulse. This pen pulse is then passed to NOR gate 401 and, after a delay, is applied to NOR gate 409. A positive-going pen pulse is therefore provided to NOR gate 410 and NOR gate 410 passes a negative-going pulse to NOR gate 405. With both inputs of NOR gate 405 being low, its output goes high for the duration of the pen pulse and this outgoing pen pulse is then passed to monopulser 333 in FIG. 3B.

After the termination of the 130 microsecond interval the output of monopulser 404 goes back down low. The output of NOR gate 408 goes high to disable NOR gate 409 and NOR gate 409 now blocks any noise burst which may be received (and delayed) during this interval while monopulser 404 is restoring. Monopulser 404 also re-enables NOR gate 402 to restore the circuitry of pen pulse discriminator 332 to its initial condition. Thus, a "window", occurring between 120 microseconds and 130 microseconds after a first pen pulse, has been created and pen pulse discriminator 332 is arranged to look for a second pen pulse during this "window" interval.

Although a specific embodiment of this invention has been shown and described, it will be understood that various modifications may be made without departing from the spirit of this invention.

We claim:

1. In a system for sensing an electron beam which traverses successive scan lines on a display screen,
   a light pen for sensing the electron beam, the light pen having an aperture sufficient in size to enable the pen to sense an area covering elements of two successive scan lines on the screen,
   means responsive to each electron beam sensing for providing an output pulse, and
   means for producing a light probe signal when successive output pulses are separated by an interval of time corresponding to the interval between successive beam traversals.

2. In a system for sensing an electron beam which traverses successive scan lines on a display screen in accordance with claim 1, wherein the light pen includes a bundle of light sensitive fibers displaced in the aperture of the light pen and extending to the providing means and wherein the providing means includes a light sensitive device for sensing a light pulse passed through the fibers and for producing an electron pulse in response thereto.

3. In a system for sensing an electron beam which traverses successive scan lines on a display screen in accordance with claim 1, wherein the traversing of the electron beam is controlled by synchronizing signals and wherein the system further includes means responsive to the producing means and the synchronizing signals for identifying the screen area being sensed by the light pen.

4. In a system for sensing an electron beam which traverses successive scan lines on a display screen in accordance with claim 3, wherein the providing means includes means for combining the synchronizing signals and the output pulses, the means for producing detects the output pulses in the combined signals and pulses and the identifying means detects the synchronizing signals in the combining signals and pulses.

5. A video telephone system comprising at least one video telephone station and a remote data station,
   the video telephone station including a cathode-ray tube responsive to synchronizing signals for controlling an electron beam to traverse successive scan lines on a display screen, a light pen for sensing the electron beam and arranged to sense an area covering elements of two successive scan lines on the screen, and means responsive to each beam sensing for transmitting a pen pulse to the remote data station,
   the remote data station including means for producing a light probe signal in response to the reception of successive pulses separated by an interval of time corresponding to the interval between successive beam traversals.

6. A video telephone system in accordance with claim 5 wherein the transmitting means further includes means for combining the synchronizing signals with the pen pulses and transmitting the synchronizing signals together with the pen pulses to the remote data station and wherein the remote station further includes means responsive to the reception of the synchronizing signals and to the produced light probe signal for identifying the screen area being sensed by the light pen.

7. A video telephone system in accordance with claim 6 wherein the remote data station further includes video signal producing and transmitting means for transmitting the synchronizing signals and video signals to the video telephone station and the video telephone station further includes receiving means for applying received video and synchronizing signals to the cathode-ray tube.

8. In a system for sensing an electron beam which traverses successive scan lines on a display screen,
   a method of determining a true light probe signal in the presence of interference comprising the steps of:
   sensing an area on the screen sufficient in size to cover elements of two successive scan lines and
   producing a light probe signal when successive beam sensings are separated by an interval of time corresponding to the interval between successive beam traversals.

9. A method of determining a true light probe signal in accordance with claim 8, wherein the sensing of an area on the screen includes the step of positioning an aperture of a light pen over the screen area to be sensed, the light pen aperture being dimensioned to correspond to the screen area to be sensed.

* * * * *